April 5, 1966     N. T. WHITAKER     3,244,447
AUTOMOBILE SUN VISORS
Filed June 29, 1965

INVENTOR
NORMAN T. WHITAKER

United States Patent Office 3,244,447
Patented Apr. 5, 1966

3,244,447
AUTOMOBILE SUN VISORS
Norman T. Whitaker, 3237 M St. NW.,
Washington, D.C. 20007
Filed June 29, 1965, Ser. No. 468,082
3 Claims. (Cl. 296—97)

This invention relates to anti-glare shields or sun visors for motor vehicles. Its object is to make safer driving by lowering the hazard to the operator from glare of the sun.

More particularly, the principal object of the invention is to mount the visor normally in front of the passenger so as to swing laterally to a position in front of the driver, to supplement the driver's visor when it is positioned to the side.

Figure 1:
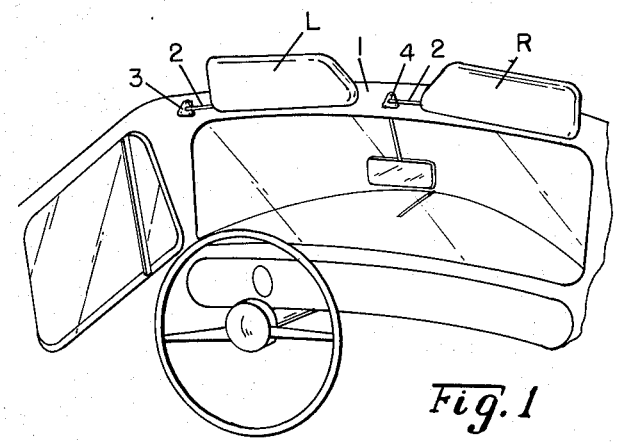
Figure 2:
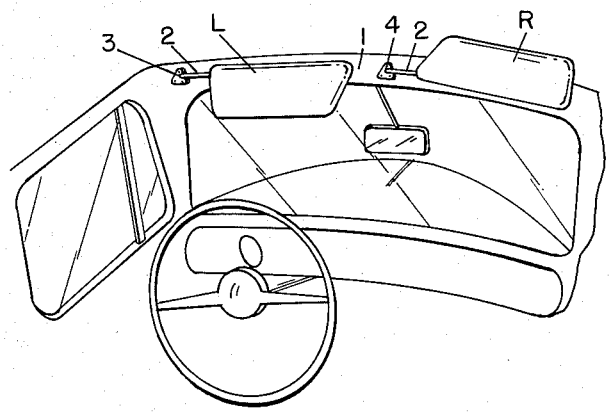
Figure 3:
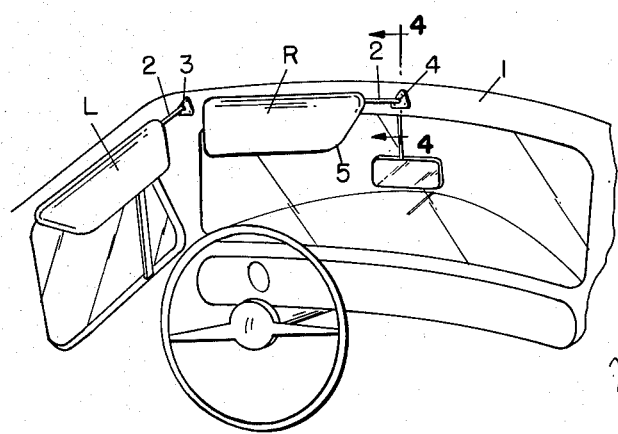
Figure 4:
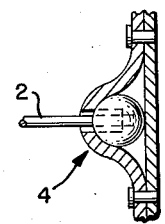

In the drawing, FIGURE 1 is a perspective looking forward from the left side (driver's side) of an automobile. FIG. 2 shows the driver's visor down to prevent glare from the front. FIG. 3 shows both visors in position to stop glare from the front, and also from the left. FIG. 4 is an enlarged view of a suitable mounting bracket for the passenger's visor, partly in section on lines 4—4 of FIG. 3.

To the header 1 above the windsield frame are two visors or glare shields. They are flat, and may be opaque or translucent; and substantially rectangular shaped.

Each visor (left L in front of the operator; and right R in front of the passenger to the right of the driver) is shown in FIGURE 1. Each is suspended from a horizontal arm or rod 2. The free end, that is, that end which extends beyond the visor of each rod may be clamped, hooked, or slipped into a friction catch.

A conventional clamping bracket which would be suitable for use with this invention is shown in FIG. 4; there the rod 2 ends in a ball, making up the portion clamping between two plates forming a friction socket therefor. The rod is received and restricted in movement by a horizontally disposed actuate slot, as shown in broken lines. The arc should be slightly more than 180° for bracket 4, and slightly more than 90° for similar bracket 3.

The L visor is swiveled, indicated at 3 to the upper left of the operator. This visor may take three (3) positions: to the left of the head of the operator (FIGURE 3) to prevent sunshine or glare from the left of the auto. Then, too, this visor may be swung to its normal working position in front of the eyes of the driver, as shown in FIGURE 2. In inert or storage position of visor L, it is pushed parallel to the top of the automobile as shown in FIGURE 1.

The right visor R is swiveled at 4 to the left of said visor near the center of header 1, illustrated in FIGURE 3.

This is a novel construction: permitting this right visor R to be positioned normally in front of the passenger then by arcuate swiveling said right visor R through 180° to be positioned in front of the car operator. If sun glare comes from the right, while on a tortuous road, the driver operating from the left side of the automobile places the visor L in front of him, as shown in FIGURE 2, then turns visor R to hang in a vertical plane toward the rear of the automobile (longitudinally of it).

Assume the foregoing description to apply to a left-hand drive. Assume that the sun is on an angle to the front and to the right of the car.

The inventor has previously found in such difficulty that the left visor must be swung or positioned to the left of the driver, FIGURE 3. Upon reaching a road curve, when the sun glare is then in front of the driver, he must take his left hand from a steering wheel—a hazard—and to swing said L visor to the front. This is overcome herein.

The primary object of my invention is this: when the sun glare comes from the left or front of the car, the left visor L is anchored in vertical position to the left of the driver, FIGURE 3. Whereupon, the right visor R is swung to the front of the driver, FIGURE 3.

This double visor construction is especially valuable to shield the driver who is approaching a rising or a setting sun, particularly where the road is curved or tortuous. In the few cars having a right hand drive, the same objects of my invention, with its anti-glare advantages, will be apparent.

The visor or glare shield R (right) may have to have a lower corner removed, as shown at 5, so that the visor will not obstruct an inside mirror.

I claim:
1. A multiple shield sun visor in combination with an automobile comprising a first mounting bracket secured on an upper inside corner portion of the automobile body encompassing the windshield, a substantially horizontal supporting arm pivotally and rotatably carried by said bracket, said arm and visor being adapted to be positioned in front of the driver or to the side of the driver to prevent frontal or side glare to the view of the driver of the automobile, a second mounting bracket secured to the inside upper approximately medial portion of the automobile body encompassing the windshield, a substantially horizontal support arm pivotally and rotatably carried by said second mounting bracket, a visor mounted on said supporting arm, said arm and visor carried by said second mounting bracket being adapted to be positioned in front of the driver or the passenger of the front seat of the automobile to prevent frontal glare.

2. The invention as defined in claim 1, wherein said first mounting bracket is located adjacent the upper left inside corner of the automobile body portion encompassing the windshield.

3. In a motor vehicle having separately adjustable sun visors for the driver and a passenger next to him, the driver's visor pivotally mounted on an upper inside corner portion of the automobile body encompassing the windshield and being swingable about a vertical axis from a first position in front of his head to a second position between it and the near side of the vehicle, and wherein both visors are swingable about respective horizontal axes from depending operative positions to upper inoperative positions, the improvement consisting of fixed bracket means medial of the motor vehicle mounting the passenger's visor for swinging adjustment through substantially 180° about a vertical axis, from a position in front of the passenger's head to said first position in front of the driver's head, whereby the passenger's visor may supplement the driver's visor when in said second position, affording maximum eye-shielding for the driver on curved roads.

References Cited by the Examiner
UNITED STATES PATENTS

| 1,599,183 | 9/1926 | Phillips | 296—97 |
| 1,745,695 | 2/1930 | Hunter. | |
| 2,978,274 | 4/1961 | Ordman | 296—97 |

BENJAMIN HERSH, Primary Examiner.

J. A. PEKAR, Assistant Examiner.